US010247247B2

(12) United States Patent
Yanagidani et al.

(10) Patent No.: US 10,247,247 B2
(45) Date of Patent: Apr. 2, 2019

(54) SPLINE CONNECTION STRUCTURE AND SPLINE SHAFT (71) Applicant: IHI Corporation, Koto-ku (JP)

(72) Inventors: Nobutaka Yanagidani, Tokyo (JP); Daigo Yoneda, Tokyo (JP); Norimasa Taga, Tokyo (JP); Junichi Enomoto, Tokyo (JP); Kimiaki Nakamura, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/646,319

(22) Filed: Jul. 11, 2017

(65) Prior Publication Data

US 2017/0307023 A1    Oct. 26, 2017

Related U.S. Application Data (63) Continuation of application No. PCT/JP2016/054270, filed on Feb. 15, 2016.

(30) Foreign Application Priority Data

Apr. 2, 2015   (JP) ................... 2015-075988

(51) Int. Cl.
*F16D 1/10*    (2006.01)
*F16D 1/02*    (2006.01)
(Continued)

(52) U.S. Cl.
CPC .............. *F16D 1/10* (2013.01); *F01D 5/026* (2013.01); *F16C 3/03* (2013.01); *F16D 1/02* (2013.01);
(Continued)

(58) Field of Classification Search
CPC .......... F16C 2226/80; F16D 1/02; F16D 1/10; F16D 3/185; F16D 2001/103;
(Continued)

(56) References Cited

U.S. PATENT DOCUMENTS 1,381,805 A * 6/1921 Crewdson ................. B04B 9/12
403/359.1
1,443,837 A * 1/1923 Eberhardt ............... F16H 55/08
74/466

(Continued)

FOREIGN PATENT DOCUMENTS

DE    19613462 A1 * 10/1997 ........... B25B 13/481
EP    0 318 266 A1    5/1989
(Continued)

OTHER PUBLICATIONS

"The Centre of Curvature and the Evolute." [online], [retrieved on Jul. 26, 2018]. Retrieved from the Internet <URL: https://www3.ul.ie/~rynnet/swconics/E-COC.htm#Parabola>.*
(Continued)

*Primary Examiner* — Josh Skroupa
(74) *Attorney, Agent, or Firm* — Oblon, McClelland, Maier & Neustadt, L.L.P.

(57) ABSTRACT

A spline connection structure includes a shaft portion having teeth with crowned tooth surfaces formed at equal intervals on an outer circumferential surface and a cylindrical portion having grooves into which the teeth of the shaft portion are fitted formed on an inner circumferential surface are connected. Two adjacent tooth surfaces facing each other are bent while maintaining a constant distance therebetween in a tooth width direction when viewed from a diameter direction of the shaft portion.

8 Claims, 7 Drawing Sheets (51) Int. Cl.
  *F16C 3/03* (2006.01)
  *F01D 5/02* (2006.01)
(52) U.S. Cl.
  CPC .......... *F16D 1/101* (2013.01); *F05D 2240/60* (2013.01); *F05D 2260/4031* (2013.01); *F16C 2226/80* (2013.01); *F16D 2001/103* (2013.01); *Y10T 403/7035* (2015.01)
(58) Field of Classification Search
  CPC .......... Y10T 403/559; Y10T 403/7026; Y10T 403/7028; Y10T 403/7031; Y10T 403/7032; Y10T 403/7033; Y10T 403/7035
  USPC .............. 464/74, 158; 403/298, 359.1–359.6
  See application file for complete search history.

(56) References Cited

U.S. PATENT DOCUMENTS

| | | | |
|---|---|---|---|
| 4,913,681 A * | 4/1990 | Green | F16D 3/185 |
| | | | 464/154 |
| 5,503,494 A | 4/1996 | Kamata et al. | |
| 5,533,825 A | 7/1996 | Stone | |
| 5,580,183 A | 12/1996 | Brackoneski et al. | |
| 5,829,911 A | 11/1998 | Yokota et al. | |
| 7,040,870 B2 * | 5/2006 | Nicolas | B29C 47/367 |
| | | | 417/410.4 |
| 7,288,029 B1 | 10/2007 | Lyon et al. | |
| 8,348,542 B2 * | 1/2013 | Church | E21B 17/04 |
| | | | 403/359.6 |
| 9,382,001 B2 * | 7/2016 | Foskey | F16D 3/185 |
| 2007/0084190 A1 | 4/2007 | Moniz et al. | |

FOREIGN PATENT DOCUMENTS

| | | |
|---|---|---|
| JP | 63-45223 U | 3/1988 |
| JP | 63-45224 U | 3/1988 |
| JP | 7-83242 | 3/1995 |
| JP | 9-25941 | 1/1997 |
| JP | 9-141354 | 6/1997 |
| JP | 9-512610 | 12/1997 |
| JP | 2002-327771 | 11/2002 |
| JP | 2005-9615 | 1/2005 |
| JP | 2007-113578 | 5/2007 |
| JP | 2007-198401 | 8/2007 |
| JP | 2007-247771 | 9/2007 |
| JP | 2010-54027 | 3/2010 |

OTHER PUBLICATIONS

"Finding the Focal Point." WGBH Educational Foundation. 2007.*
International Search Report dated May 10, 2016 in PCT/JP2016/054270 filed Feb. 15, 2016 (with English translation).
Written Opinion dated May 10, 2016 in PCT/JP2016/054270 filed Feb. 15, 2016.

* cited by examiner

SPLINE CONNECTION STRUCTURE AND SPLINE SHAFT

CROSS-REFERENCE TO RELATED APPLICATIONS

The present application is a continuation application of International Application No. PCT/JP2016/054270, filed Feb. 15, 2016, which claims priority to Japanese Patent Application No. 2015-075988, filed Apr. 2, 2015. The contents of these applications are incorporated herein by reference in their entirety.

TECHNICAL FIELD

The present disclosure relates to a spline connection structure and a spline shaft.

BACKGROUND

Conventionally, in a jet engine or the like for an aircraft, a spline connection structure is used as a structure for connecting a shaft and a rotating body. For example, a rotor of a fan or a rotor of a low-pressure turbine is connected to a shaft by a spline connection structure. The spline connection structure has a structure in which a shaft portion having teeth formed at equal intervals on an outer circumferential surface and a cylindrical portion having grooves into which the teeth of the shaft portion are fitted formed on an inner circumferential surface are connected. The following Patent Documents 1 to 7 disclose the background art related to a spline connection structure and a spline shaft.

DOCUMENTS OF THE RELATED ART

Patent Document

[Patent Document 1]
  Japanese Unexamined Patent Application, First Publication No. 2010-54027
[Patent Document 2]
  Japanese Unexamined Patent Application, First Publication No. 2007-198401
[Patent Document 3]
  Japanese Unexamined Patent Application, First Publication No. H09-141354
[Patent Document 4]
  Japanese Unexamined Patent Application, First Publication No. H07-83242
[Patent Document 5]
  Published Japanese Translation No. H09-512610 of the PCT International Publication
[Patent Document 6]
  Japanese Unexamined Patent Application, First Publication No. 2005-9615
[Patent Document 7]
  Japanese Unexamined Utility Model Application, First Publication No. S63-45223

SUMMARY

In a jet engine of an aircraft, because a torque acting on a shaft is large, the shaft may be slightly twisted when the shaft is rotating. Even in this case, crowning is applied to a tooth surface on one side of a tooth of a shaft portion (an upstream side in a rotating direction) to secure a wide contact surface between the tooth surface of the tooth of the shaft portion and a cylindrical portion in some cases. Crowning means that the tooth surface is bent so that a central portion thereof bulges when viewed from a diameter direction of the shaft portion. Crowning is work of flattening the tooth surface when the shaft portion is twisted.

However, in the shaft portion in which crowning is applied to the tooth surface on one side of the tooth, the tooth has a complicated shape in which only the tooth surface on one side is bent. For this reason, work of polishing tooth surfaces on both sides of the tooth with a grindstone is necessary at the time of manufacturing the shaft portion. The work using a grindstone is not generally completed in one step and requires a plurality of steps while the roughness of the grindstone is varied. Therefore, manufacturing the shaft portion conventionally takes a very long time.

The present disclosure has been made in view of the above-described problems, and an objective of the present disclosure is to provide a spline connection structure which allows the processing time of a shaft portion having crowned teeth to be reduced.

To solve the above problem, the present disclosure employs the following constitution.

According to a first aspect of the present disclosure, there is provided a spline connection structure in which a shaft portion having teeth with crowned tooth surfaces formed at equal intervals on an outer circumferential surface and a cylindrical portion having grooves into which the teeth of the shaft portion are fitted formed on an inner circumferential surface are connected, wherein two adjacent tooth surfaces facing each other are bent while maintaining a constant distance therebetween in a tooth width direction when viewed from a diameter direction of the shaft portion. The tooth width direction refers to a direction that is parallel to a direction of an axial center (an axial center of the shaft portion) of the spline connection structure.

A second aspect of the present disclosure is a spline shaft using the spline connection structure of the first aspect.

According to the present disclosure, two adjacent tooth surfaces in the shaft portion are bent while maintaining a constant distance therebetween in the tooth width direction when viewed from the diameter direction of the shaft portion. In the shaft portion having the above shape, because tooth surfaces on both sides of a tooth are bent in the same manner, a tooth can be formed by cutting a circumferential surface of the shaft portion with a hob cutter. Normally, in the cutting using a hob cutter, the circumferential surface of the shaft portion is cut by bringing the hob cutter in contact with the circumferential surface of the shaft portion while rotating the hob cutter at a constant speed in the axial direction of the shaft portion and moving the shaft portion in the axial direction while rotating the shaft portion. In this way, a tooth is formed in a straight-line shape in a shorter time compared to polishing with a grindstone. In addition, a bent tooth can be formed instead of an originally formed straight-line shaped tooth by continuously varying the rotational speed of the shaft portion while rotating the shaft portion. Consequently, the shaft portion of the present disclosure having the shape in which tooth surfaces on both sides of a tooth are bent in the same manner may be formed in a short time by continuously varying the rotational speed of the shaft portion while cutting the circumferential surface of the shaft portion with the hob cutter. In addition, because a tooth surface on one side of the tooth becomes a bent surface so that a central portion thereof in the axial direction bulges, the shaft portion to which crowning is applied can be formed. Thus, according to the present disclosure, the processing time of the shaft portion to which crowning is applied that is used for the spline connection structure can be allowed to be reduced.

DETAILED DESCRIPTION

Hereinafter, an embodiment of a spline connection structure according to the present disclosure will be described with reference to the drawings. In the drawings below, the scale of each member is appropriately changed so that each member has a recognizable size.

Figure 1:
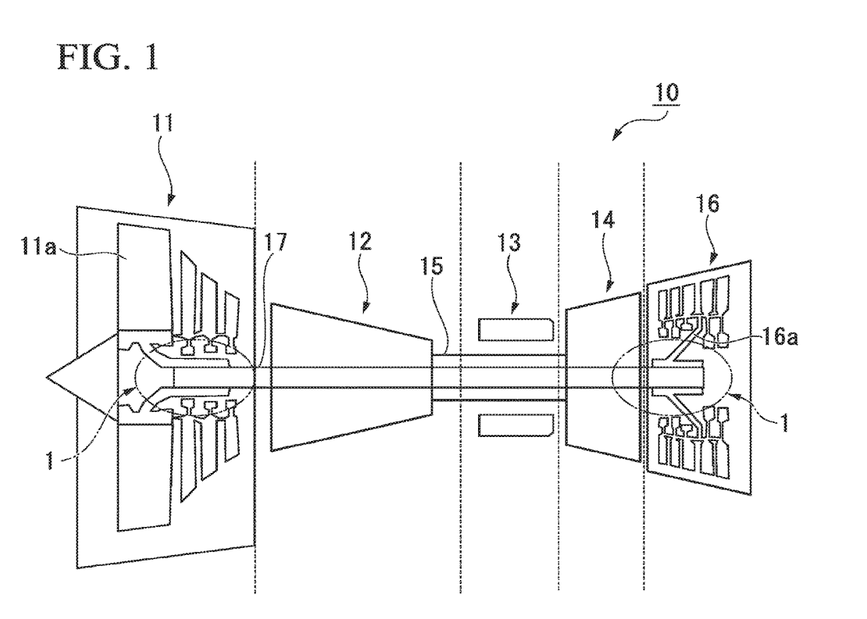
FIG. 1 is a schematic view of a jet engine to which a spline connection structure according to an embodiment of the present disclosure is applied.

FIG. 1 is a schematic view of a jet engine 10 to which a spline connection structure 1 according to the present embodiment is applied. In the following description, with respect to an air flow direction, a left side of FIG. 1 will be referred to as an upstream side, and a right side of FIG. 1 will be referred to as a downstream side. As show in FIG. 1, the jet engine 10 includes a fan 11, a compressor 12, a combustor 13, a high-pressure turbine 14, a high-pressure shaft 15, a low-pressure turbine 16, and a low-pressure shaft 17. The fan 11 is arranged at the most upstream portion of the jet engine 10 and takes in outside air to generate a propulsive force and be supplied to the compressor 12. The fan 11 includes a rotor 11a connected to the low-pressure shaft 17 and rotated by the low-pressure shaft 17. The rotor 11a includes a cylindrical portion (a cylindrical portion 3 included in the spline connection structure 1 of the present embodiment described below) directly fixed to the low-pressure shaft 17, a disk-shaped disk integrated with the cylindrical portion, a fan blade fixed to an outer circumferential portion of the disk, and the like.

The compressor 12 is arranged downstream from the fan 11, compresses the air taken in by the fan 11, and delivers the compressed air downstream. The combustor 13 is arranged downstream from the compressor 12, mixes fuel with the air compressed by the compressor 12, combusts the mixture of fuel and air, and discharges the combustion gas generated by the combustion downstream. The high-pressure turbine 14 is arranged downstream from the combustor 13, receives the combustion gas discharged from the combustor 13, and generates rotational force. The high-pressure shaft 15 connects the high-pressure turbine 14 and the compressor 12 and transmits the rotational force generated by the high-pressure turbine 14 to the compressor 12. The high-pressure shaft 15 is a hollow shaft having the low-pressure shaft 17 inserted thereinto.

The low-pressure turbine 16 is arranged at the most downstream portion of the jet engine 10, receives the combustion gas passing through the high-pressure turbine 14, and generates rotational force. The low-pressure turbine 16 includes a rotor 16a connected to the low-pressure shaft 17 and rotated by the low-pressure shaft 17. The rotor 16a includes a cylindrical portion (corresponds to the cylindrical portion 3 included in the spline connection structure 1 of present embodiment described below) directly fixed to the low-pressure shaft 17, a disk-shaped disk integrated with the cylindrical portion, a turbine blade fixed to an outer circumferential portion of the disk, and the like.

The low-pressure shaft 17 connects the low-pressure turbine 16 and the fan 11, and transmits the rotational force generated by the low-pressure turbine 16 to the fan 11. Teeth are formed at a connection location between the low-pressure shaft 17 and the rotor 16a of the low-pressure turbine 16 and a connection location between the low-pressure shaft 17 and the rotor 11a of the fan 11. The two connection locations correspond to a shaft portion 2 included in the spline connection structure 1 of the present embodiment.

In the jet engine 10, the propulsive force is obtained by compressing the air taken in by the fan 11 and delivering the air downstream, and a portion of the outside air taken in by the fan 11 is compressed by the compressor 12. Further, the air compressed by the compressor 12 is mixed with fuel and combusted in the combustor 13, thereby generating combustion gas. The propulsive force is also obtained by the combustion gas passing through the high-pressure turbine 14 and the low-pressure turbine 16 and being injected downstream.

Figure 2:
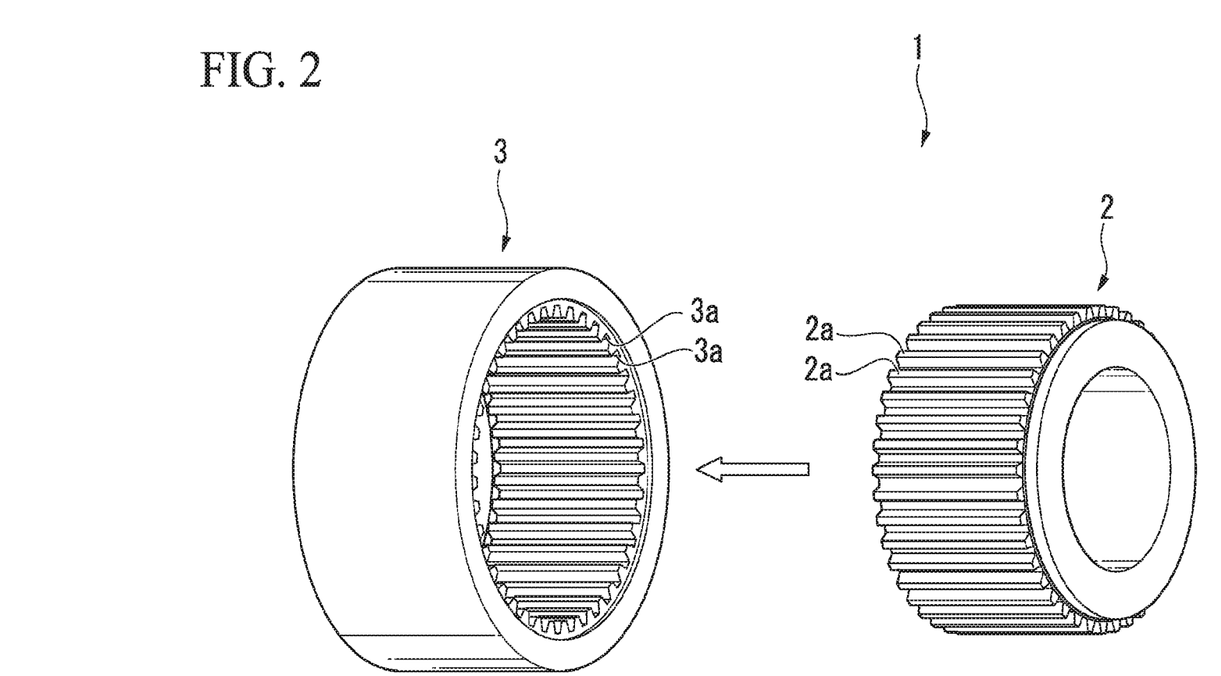
FIG. 2 is an exploded perspective view showing the spline connection structure according to an embodiment of the present disclosure.

FIG. 2 is an exploded perspective view showing the spline connection structure 1 of the present embodiment. The spline connection structure 1 of the present embodiment is used as a connection structure between the rotor 16a of the low-pressure turbine 16 and the low-pressure shaft 17 and a connection structure between the rotor 11a of the fan 11 and the low-pressure shaft 17 in the above-described jet engine 10, and is a structure that connects the shaft portion 2 and the cylindrical portion 3.

Figure 3A:
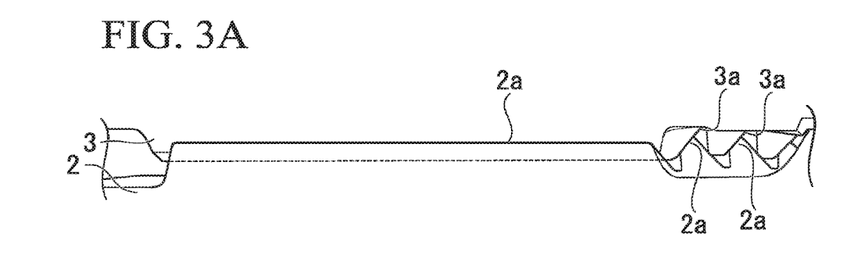
FIG. 3A is a partially enlarged perspective view of a state in which a shaft portion and a cylindrical portion of the spline connection structure according to an embodiment of the present disclosure are fitted together.
Figure 3B:
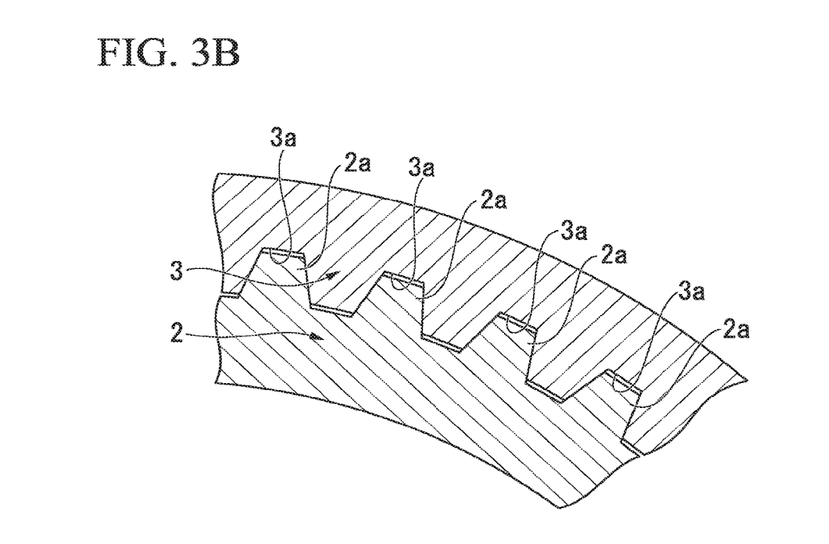
FIG. 3B is a partially enlarged view of the state in which the shaft portion and the cylindrical portion of the spline connection structure according to an embodiment of the present disclosure are fitted together, viewed from the axial direction of the shaft portion.

The shaft portion 2 has teeth 2a formed at equal intervals on an outer circumferential surface. A single tooth 2a is formed to extend in the axial direction of the shaft portion 2 and has a substantially trapezoidal cross-section. The cylindrical portion 3 is a hollow member having the shaft portion 2 inserted thereinto, and has grooves 3a into which the teeth 2a of the shaft portion 2 are fitted formed at an inner circumferential surface. Like the tooth 2a of the shaft portion 2, a single groove 3a has a substantially trapezoidal cross-section. FIG. 3A is a partially enlarged perspective view of a state in which the shaft portion 2 and the cylindrical portion 3 are fitted together. Also, FIG. 3B is a partially enlarged view of the state in which the shaft portion 2 and the cylindrical portion 3 are fitted together, viewed from the axial direction of the shaft portion 2. As show in FIG. 3A and FIG. 3B, when the shaft portion 2 is inserted into the cylindrical portion 3, the teeth 2a of the shaft portion 2 are fitted into the grooves 3a of the cylindrical portion 3. In this way, the shaft portion 2 and the cylindrical portion 3 are fixed in the circumferential direction.

Figure 4:
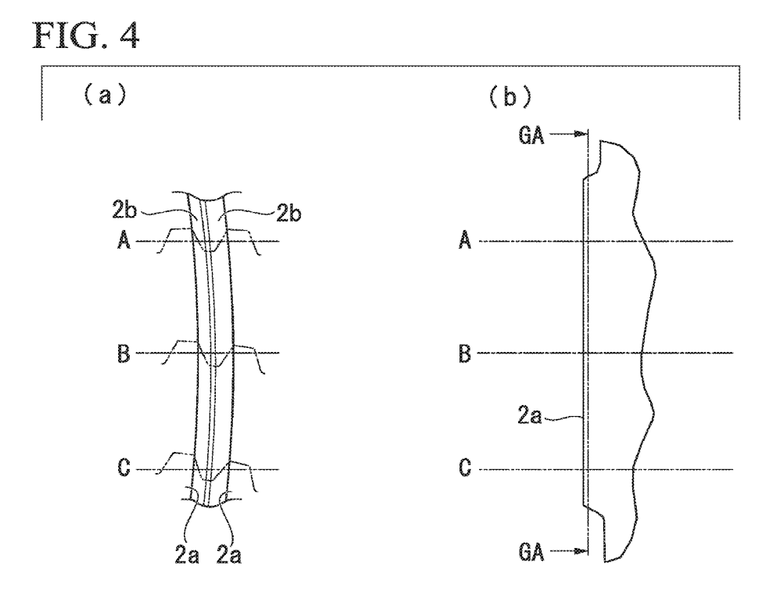
FIG. 4 is a schematic view showing a shape of the shaft portion in the spline connection structure according to an embodiment of the present disclosure, in which (a) shows a tooth groove sandwiched between two teeth viewed from a diameter direction of the shaft portion and (b) is a side view of a tooth.

FIG. 4(a) and FIG. 4(b) are schematic views showing the shape of the shaft portion 2. FIG. 4(a) is a view of a tooth groove sandwiched between two teeth 2a that is viewed from a diameter direction of the shaft portion 2, and FIG. 4(a) corresponds to a cross-sectional view taken along the line GA-GA in FIG. 4(b). FIG. 4(b) is a side view of the tooth 2a. In the shaft portion 2, the teeth 2a are arranged at equal intervals in the circumferential direction. For this reason, as show in FIG. 4(a), tooth surfaces 2b of adjacent teeth 2a are arranged to face each other. In the spline connection structure 1 of the present embodiment, as show in FIG. 4(a), the adjacent tooth surfaces 2b facing each other are bent while maintaining a constant distance therebetween in a tooth width direction (a vertical direction in FIG. 4(a)) when viewed from a diameter direction of the shaft portion 2. That is, in the spline connection structure 1 of the present embodiment, as show in FIG. 4(a), the two tooth surfaces 2b are bent in the circumferential direction of the shaft portion 2 throughout the tooth width direction while a separation distance between the tooth surfaces 2b at the position A, a separation distance between the tooth surfaces 2b at the position B, and a separation distance between the tooth surfaces 2b at a position C are the same.

Further, in FIG. 4(a), the shaft portion 2 is rotated so that the teeth 2a move to the right. In a single tooth 2a, one tooth surface 2b is downstream (to the right in FIG. 4(a)) and is upstream (to the left in FIG. 4(a)) in a moving direction of the tooth 2a when the shaft portion 2 is rotated. In the spline connection structure 1 of the present embodiment, the downstream tooth surface 2b is bent so that a central portion thereof in the tooth width direction bulges toward the downstream side in the moving direction of the tooth 2a. Also, the upstream tooth surface 2b is bent so that the central portion thereof in the tooth width direction is recessed toward the downstream side in the moving direction of the tooth 2a.

Figure 5:
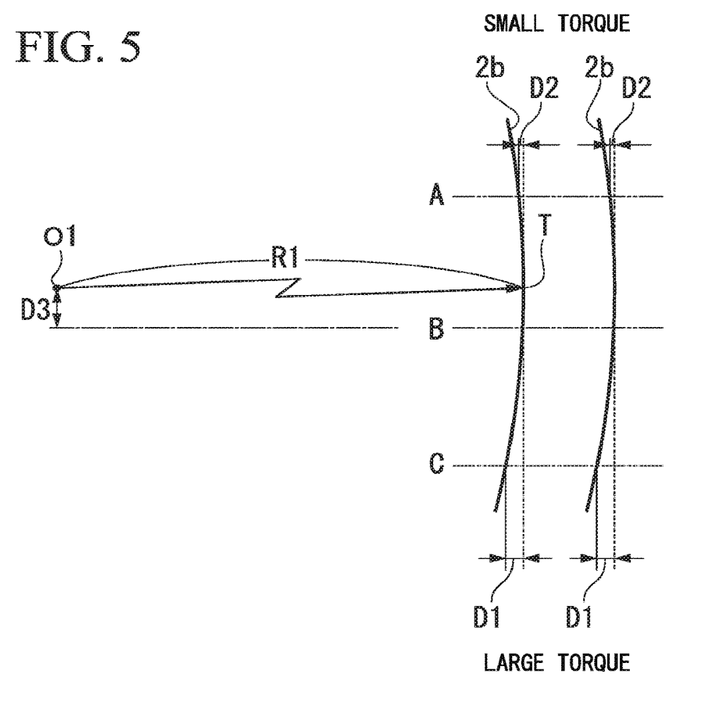
FIG. 5 is a schematic view showing a bent state of a tooth surface of a tooth of the shaft portion in the spline connection structure according to an embodiment of the present disclosure.

FIG. 5 is a schematic view showing a bent state of the tooth surface 2b. As show in FIG. 5, the tooth surface 2b is bent along an arc having a radius of curvature R1 with a center of curvature O1 as the center. That is, in the spline connection structure 1 of the present embodiment, the tooth surface 2b is bent with a constant radius of curvature R1 when viewed from the diameter direction of the shaft portion 2. Also, in the spline connection structure 1 according to the present embodiment, the adjacent tooth surfaces 2b facing each other are bent while maintaining a constant distance therebetween in the tooth width direction when viewed from the diameter direction of the shaft portion 2. Thus, the radii of curvature of all the tooth surfaces 2b are the same. Therefore, the positions of the centers of curvature O1 of the adjacent tooth surfaces 2b facing each other are spaced apart in the circumferential direction of the shaft portion 2 by the same distance as the separation distance between the tooth surfaces 2b.

Also, in the spline connection structure 1 of the present embodiment, as show in FIG. 5, the center of curvature O1 is arranged to be closer to a side on which the torque acting on the tooth 2a is small than to a central position in the tooth width direction (a vertical direction in FIG. 5) by a distance D3. In other words, the position of the center of curvature O1 of the tooth surface 2b is set to be located on the side on which the torque acting on the tooth 2a is small in the tooth width direction.

For example, at the connection location between the low-pressure turbine 16 and the low-pressure shaft 17, because blade rows of the low-pressure turbine 16 that generate rotational force are arranged in the axial direction of the low-pressure shaft 17, the torque increases and the torque acting on the teeth 2a increases toward the front of the jet engine 10. Therefore, in the spline connection structure 1 applied to the connection location between the low-pressure turbine 16 and the low-pressure shaft 17, the center of curvature O1 is set to be located on a side on which the torque is smaller than at the central position in the tooth width direction, e.g., on the rear side of the jet engine 10. Further, at the connection location between the fan 11 and the low-pressure shaft 17, because blade rows of the fan 11 that is rotated by rotational force are installed in the axial direction of the low-pressure shaft 17, the torque decreases and the torque acting on the teeth 2a decreases toward the front of the jet engine 10. Therefore, in the spline connection structure 1 applied to the connection location between the fan 11 and the low-pressure shaft 17, the center of curvature O1 is set to be located on a side on which the torque is smaller than at the central position in the tooth width direction, e.g., on the front side of the jet engine 10.

In this manner, by the position of the center of curvature O1 of the tooth surface 2b being displaced and set toward the side on which the torque acting on the tooth 2a is small in the tooth width direction, in the case of the tooth surface 2b facing downstream in the moving direction of the tooth 2a, a position T (see FIG. 5) at which the tooth surface 2b bulges toward the most downstream side thereof is displaced to a side on which the torque is smaller than at the central position B. As a result, a difference distance D1 between the position of the tooth surface 2b at the position C, which is spaced apart from the central position B toward the side on which the torque is larger, and the position T is larger than a difference distance D2 between the position of the tooth surface 2b at the position A, which is spaced apart from the central position B by the same distance as the distance between the central position B and the position C toward the side on which the torque is smaller, and the position T. Because a twist angle of the shaft portion 2 increases at a location at which the torque acting on the tooth 2a is large, the tooth surface 2b may become closer to a flat surface during rotation when the difference distance D1 is made larger than the difference distance D2.

Figure 6:
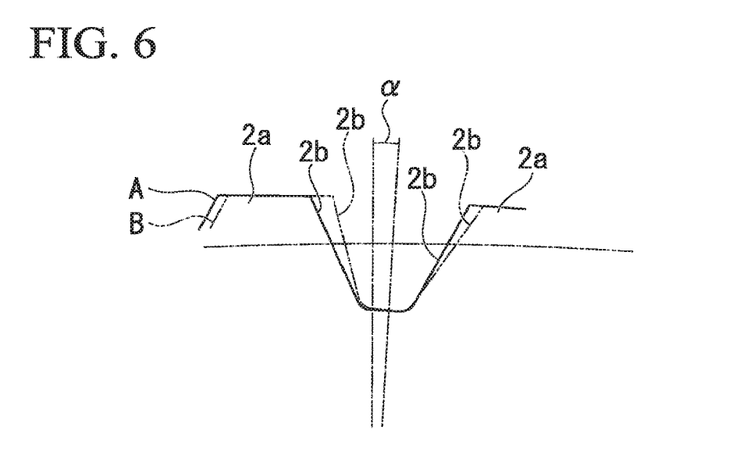
FIG. 6 is a schematic view in which cross sections of teeth at a position A and a central position B in (a) of FIG. 4 overlap.

Also, because the circumferential surface of the shaft portion where the teeth 2a are formed is a bent surface, in the case of the tooth 2a having the tooth surface 2b bent as described above, a cross-sectional shape thereof at the central position B has a shape that is rotated by an angle α in the circumferential direction of the shaft portion 2 about the axial center of the shaft portion 2 with respect to a cross-sectional shape thereof at the position A, as show in FIG. 6. Likewise, a cross-sectional shape thereof at the position C has a shape that is rotated in the circumferential direction of the shaft portion 2 about the axial center of the shaft portion 2 with respect to the cross-sectional shape thereof at the central position B.

In the schematic views of FIG. 4 to FIG. 6, to clearly show that the tooth surface 2b of the tooth 2a is bent, the degree of curvature of the tooth surface 2b is shown to be larger than the actual degree of curvature. Actually, the tooth surface 2b is bent so that the difference distance D2 shown in FIG. 5 is about several thousandths of mm. Therefore, the tooth surface 2b of the tooth 2a is bent only to an extent that is not visible to the human eye. Thus, when the shaft portion 2 is inserted into the cylindrical portion 3, work can be performed while ignoring the curvature of the tooth surface 2b.

Figure 7A:
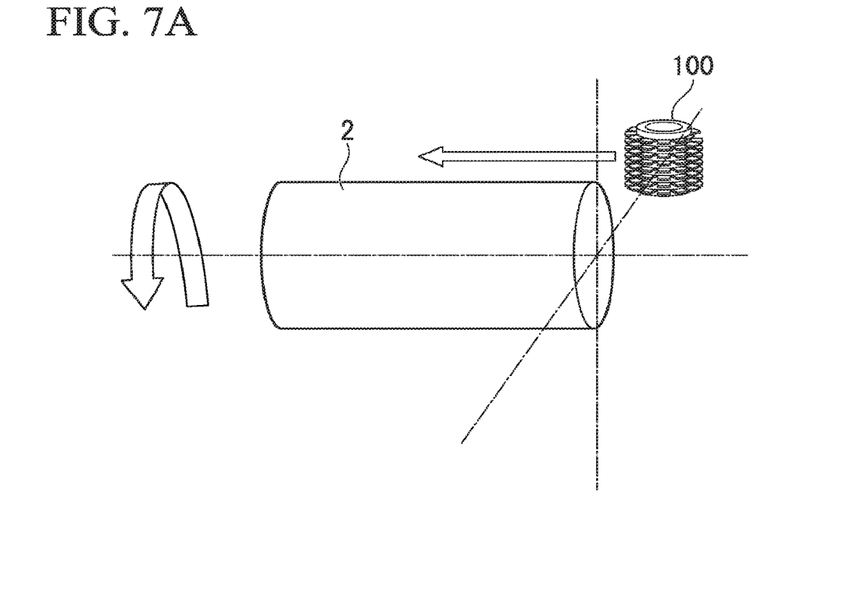
FIG. 7A is a schematic perspective view showing a step of forming the shaft portion in the spline connection structure according to an embodiment of the present disclosure.
Figure 7B:
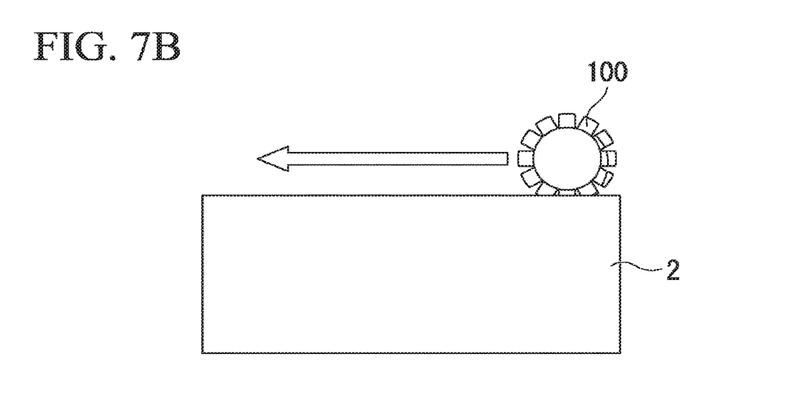
FIG. 7B is a schematic plan view showing the step of forming the shaft portion in the spline connection structure according to an embodiment of the present disclosure.

The shaft portion 2 can be formed in a short time by processing using a hob cutter. FIG. 7A and FIG. 7B are schematic views showing a process of forming the shaft portion 2. FIG. 7A is a perspective view and FIG. 7B is a plan view. As shown in FIG. 7A and FIG. 7B, the hob cutter 100 that rotates at a constant speed is brought into contact with the circumferential surface of the shaft portion 2, and the tooth 2a is formed by moving the hob cutter 100 at a constant speed in the axial direction of the shaft portion 2. Here, by properly adjusting the rotational acceleration and the moving speed of the hob cutter 100, the shaft portion 2 used in the spline connection structure 1 of the present embodiment can be formed.

According to the spline connection structure 1 of the present embodiment as described above, two adjacent tooth surfaces 2b facing each other in the shaft portion 2 are bent while maintaining a constant distance therebetween in the tooth width direction when viewed from the diameter direction of the shaft portion 2. In the shaft portion 2 having the above shape, because the tooth surfaces 2b on both sides of the tooth 2a are bent in the same manner in the circumferential direction of the shaft portion 2, the shaft portion 2 can be formed by cutting with the hob cutter 100 as described above. By cutting using the hob cutter, teeth can be formed in a shorter time compared to polishing with a grindstone. Therefore, the shaft portion 2 can be formed in a shorter time compared to the case in which the shaft portion is formed by polishing with a grindstone. Also, because the tooth surface 2b on the downstream side of the tooth 2a of the shaft portion 2 becomes a bent surface and a central portion thereof bulges, crowning is applied to the shaft portion 2. Consequently, according to the spline connection structure 1 of the present embodiment, the processing time of the shaft portion 2 to which crowning is applied can be reduced. Moreover, the shaft portion 2 used in the spline connection structure 1 of the present embodiment can also be formed using a tool such as a pinion cutter, a shaving cutter, and so on.

A working time for forming the shaft portion 2 and a working time for forming a shaft portion having the same size as that of the shaft portion 2 by polishing with a grindstone were compared. The working time for forming the shaft portion 2 was one hour whereas the working time for forming the shaft portion by polishing with a grindstone was six hours. In other words, by using the shaft portion 2, the working time for forming a shaft portion could be shortened to ⅙.

Also, in the spline connection structure 1 of the present embodiment, the tooth surface 2b is bent with a constant radius of curvature R1 when viewed from the diameter direction of the shaft portion 2. Thus, when the shaft portion 2 is formed, work can proceed without changing an absolute value of an angular acceleration of the shaft portion 2. Therefore, the shaft portion 2 can be easily formed.

Also, in the spline connection structure 1 of the present embodiment, the center of curvature O1 of the tooth surface 2b is set to be located on the side on which the torque acting on the tooth 2a is small in the tooth width direction. Thus, the position T at which the tooth surface 2b bulges most may be displaced toward the side on which the torque is small, and the difference distance (a distance between a position of the tooth surface 2b at the position T and a position of the tooth surface 2b at a target position in the circumferential direction of the shaft portion 2) D1 on the side on which the torque is large can be made to be larger than the difference distance D2 on the side on which the torque is small. In this way, the tooth surface 2b can be made to be closer to a flat surface when the shaft portion 2 is rotating, and a large contact area can be secured between the shaft portion 2 and the cylindrical portion 3.

Although exemplary embodiments of the present disclosure have been described above with reference to the drawings, the present disclosure is not limited to the above-described embodiments. The shapes and combinations of the constituent members shown in the above-described embodiments are merely examples, and various modifications can be made based on design requirements or the like within the scope not departing from the gist of the present disclosure.

For example, in the above embodiment, a constitution in which the tooth surface 2b is bent with a constant radius of curvature R1 is adopted. However, the present disclosure is not limited thereto. For example, as show in FIG. 8, a radius of curvature of an area Ra in which the torque is large may be different from a radius of curvature of an area Rb in which the torque is small. That is, a constitution in which the tooth surface 2b is bent in a shape in which curves having different radii of curvature are continuously connected when viewed from the diameter direction of the shaft portion 2 may also be adopted. By adopting the above constitution, the shape of the tooth surface 2b can be more flexibly changed so that the tooth surface 2b becomes closer to a flat surface when the shaft portion 2 rotates. Even in this case, the shaft portion 2 can be formed in a short time just by changing the rotational speed of the shaft portion 2 at the time of cutting the shaft portion 2 by the hob cutter 100.

Figure 8:
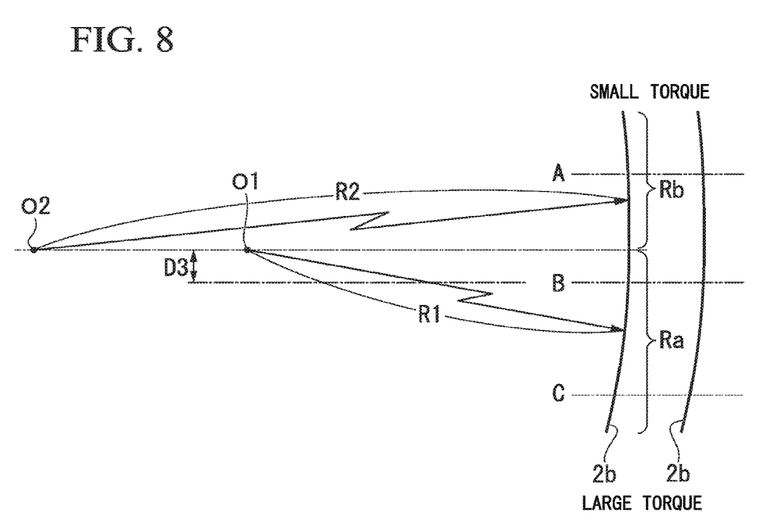
FIG. 8 is a schematic view showing a bent state of tooth surfaces of a tooth of a shaft portion in a modified example of a spline connection structure according to an embodiment of the present disclosure.

In the case in which the radii of curvature of the area Ra in which the torque is large and the area Rh in which the torque is small are different as described above, for example, a radius of curvature R2 of the area Rb in which the torque is small may be set to be larger than a radius of curvature R1 of the area Ra in which the torque is large. That is, the tooth surface 2b may be bent so that a shape in which a curve having a large radius of curvature is arranged on the side on which the torque acting on a tooth is small in the tooth width direction and a curve having a small radius of curvature is arranged on the side on which the torque acting on the tooth is large in the tooth width direction is formed. In this way, the difference distance on the side on which the torque acting on the tooth is large in the tooth width direction may be made to be larger than the difference distance on the side on which the torque acting on the tooth is small in the tooth width direction. In this way, the tooth surface 2b may be made to be closer to a flat surface during rotation.

Also, in the above embodiments, examples in which the spline connection structure 1 of the present embodiment is applied to the connection location between the low-pressure turbine 16 and the low-pressure shaft 17 and the connection location between the fan 11 and the low-pressure shaft 17 have been described. However, the present disclosure is not limited thereto. For example, the spline connection structure 1 may also be applied to a connection location between the high-pressure turbine 14 and the high-pressure shaft 15 and a connection location between the compressor 12 and the high-pressure shaft 15. The spline connection structure 1 may also be applied to a jet engine having a constitution other than that of the jet engine 10 show in FIG. 1. The spline connection structure 1 may also be applied to apparatuses other than jet engines.

INDUSTRIAL APPLICABILITY

According to the spline connection structure of the present disclosure, the processing time of the shaft portion to which crowning is applied used for the spline connection structure can be allowed to be reduced.

What is claimed is:

1. A spline connection structure in which a shaft portion having teeth formed at equal intervals on an outer circumferential surface, a tooth of the teeth with a first tooth surface crowned and a second tooth surface uncrowned on both sides of the tooth in a circumferential direction of the shaft portion, and a cylindrical portion having grooves into which the teeth of the shaft portion are fitted formed on an inner circumferential surface are connected,
wherein, of a first tooth and a second tooth adjacent to each other of the teeth, the first tooth surface of the first tooth and the second tooth surface of the second tooth which faces each other are bent while maintaining a constant distance therebetween in a tooth width direction when viewed from a diameter direction of the shaft portion,
wherein the first tooth surface of the first tooth is bent with a constant radius of curvature when viewed from the diameter direction of the shaft portion, and
wherein the first tooth is configured such that a torque acting thereon increases from a first end of the first tooth toward a second end of the first tooth in the tooth width direction, and a position of a center of curvature of the first tooth surface of the first is set to be located closer to the first end of the tooth than to a central position of the tooth in the tooth width direction.

2. A spline shaft using the spline connection structure according to claim 1.

3. A spline connection structure in which a shaft portion having teeth formed at equal intervals on an outer circumferential surface, a tooth of the teeth with a first tooth surface crowned and a second tooth surface uncrowned on both sides of the tooth in a circumferential direction of the shaft portion, and a cylindrical portion having grooves into which the teeth of the shaft portion are fitted formed on an inner circumferential surface are connected,
wherein, of a first tooth and a second tooth adjacent to each other of the teeth, the first tooth surface of the first tooth and the second tooth surface of the second tooth which faces each other are bent while maintaining a constant distance therebetween in a tooth width direction when viewed from a diameter direction of the shaft portion,
wherein the first tooth surface of the first tooth is bent in a shape in which curves having different radii of curvature are continuously connected when viewed from the diameter direction of the shaft portion, and
wherein the first tooth is configured such that a torque acting thereon increases from a first end of the first tooth toward a second end of the first tooth in the tooth width direction, and the curves include: a first curve having a first radius of curvature, and a second curve having a second radius of curvature, the second curve being located closer to the first end of the first tooth than to the first curve, and the second radius of curvature being greater than the first radius of curvature.

4. A spline shaft using the spline connection structure according to claim 3.

5. A spline connection structure in which a shaft portion having teeth formed at equal intervals on an outer circumferential surface, a tooth of the teeth with a first tooth surface crowned and a second tooth surface uncrowned on both sides of the tooth in a circumferential direction of the shaft portion, and a cylindrical portion having grooves into which the teeth of the shaft portion are fitted formed on an inner circumferential surface are connected,
wherein, of a first tooth and a second tooth adjacent to each other of the teeth, the first tooth surface of the first tooth and the second tooth surface of the second tooth which faces each other are bent while maintaining a constant distance therebetween in a tooth width direction when viewed from a diameter direction of the shaft portion,
wherein the first tooth surface of the first tooth is bent with a constant radius of curvature when viewed from the diameter direction of the shaft portion, and
wherein the first tooth includes first and second ends thereof in the tooth width direction, and a position of a center of curvature of the first tooth surface of the first tooth is set to be located closer to the first end of the first tooth than to a central position in the tooth width direction.

6. A spline shaft using the spline connection structure according to claim 5.

7. A spline connection structure in which a shaft portion having teeth formed at equal intervals on an outer circumferential surface, a tooth of the teeth with a first tooth surface crowned and a second tooth surface uncrowned on both sides of the tooth in a circumferential direction of the shaft portion, and a cylindrical portion having grooves into which the teeth of the shaft portion are fitted formed on an inner circumferential surface are connected,
wherein, of a first tooth and a second tooth adjacent to each other of the teeth, the first tooth surface of the first tooth and the second tooth surface of the second tooth which faces each other are bent while maintaining a constant distance therebetween in a tooth width direction when viewed from a diameter direction of the shaft portion,
wherein the first tooth surface of the first toot is bent in a shape in which curves having different radii of curvature are continuously connected when viewed from the diameter direction of the shaft portion, and
wherein the first tooth includes first and second ends thereof in the tooth width direction, and the curves include: a first curve having a first radius of curvature; and a second curve having a second radius of curvature, the second curve being located closer to the first end of the first tooth than to the first curve, and the second radius of curvature being greater than the first radius of curvature.

8. A spline shaft using the spline connection structure according to claim 7.

* * * * *